US007813654B1

United States Patent
Ng et al.

(10) Patent No.: US 7,813,654 B1
(45) Date of Patent: Oct. 12, 2010

(54) BROADBAND LINEARIZATION OF PHOTONIC MODULATION USING TRANSVERSAL EQUALIZATION

(75) Inventors: Willie W. Ng, Agoura Hills, CA (US); Robert R. Hayes, Calabasas, CA (US); Shubha Kadambe, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 994 days.

(21) Appl. No.: 11/117,656

(22) Filed: Apr. 27, 2005

(51) Int. Cl.
*H04B 10/04* (2006.01)
*H04B 10/12* (2006.01)

(52) U.S. Cl. ...................................................... 398/198

(58) Field of Classification Search ................ 398/140, 398/192–194, 202, 206, 213, 183, 195, 198, 398/158
See application file for complete search history.

(56) References Cited

U.S. PATENT DOCUMENTS

| | | | |
|---|---|---|---|
| 5,289,550 A * | 2/1994 | Plastow | 385/9 |
| 5,515,199 A * | 5/1996 | Farina | 359/326 |
| 5,812,297 A * | 9/1998 | Mussino et al. | 398/198 |
| 5,850,305 A * | 12/1998 | Pidgeon | 398/193 |
| 6,538,789 B2 * | 3/2003 | Sun | 398/158 |
| 6,671,465 B1 * | 12/2003 | Cohen et al. | 398/66 |
| 7,200,339 B1 * | 4/2007 | Roberts et al. | 398/159 |
| 7,224,909 B2 * | 5/2007 | Remedios et al. | 398/198 |
| 7,224,911 B2 * | 5/2007 | Dai et al. | 398/209 |
| 2003/0011847 A1 * | 1/2003 | Dai et al. | 359/161 |
| 2004/0105683 A1 * | 6/2004 | Bulow et al. | 398/147 |
| 2005/0019042 A1 * | 1/2005 | Kaneda et al. | 398/208 |
| 2005/0265440 A1 * | 12/2005 | Sohn | 375/233 |
| 2006/0008279 A1 * | 1/2006 | Chiang et al. | 398/202 |

OTHER PUBLICATIONS

Linearisation of Optical Transmitters by a Quasifeedforward Compensation Technique, J. Straus et al., Electronic Letters, Mar. 17, 1977, vol. 13, No. 6 pp. 158-159.*
Integrated Transversal Equalizers in High-Speed Fiber-Optic Systems, Hui Wu et al., IEEE Journal of Solid-State Circuits, vol. 38, No. 12, Dec. 2003 pp. 2131-2137.*
"Operational Amplifiers: Design and Applications" Edited by Tobey et al., 1971, McGraw-Hill Kogakusha, pp. 201-207.*
Korotky, K., et al, "Feedforward compensation of integrated optic modular distortions," Paper WH5, *Optical Fiber Conference* (1990).
Nazarathy, M., et al.,"Progress in Externally Modulated AM CATV Transmission Systems", *Journal of Lightwave Technology*, vol. 11, No. 1, pp. 82-105 (1993).
Sadhwani, et al., "Adaptive Electronic Linearization of Fiber Optic links,"paper ThG7, *Optical Fiber Conference* (OFC) Atlanta, Gerogia (Mar. 23-28, 2003).

* cited by examiner

*Primary Examiner*—Shi K Li
(74) *Attorney, Agent, or Firm*—Ladas & Parry (57) ABSTRACT

Transversal equalization is used to obtain broadband linearization of photonic modulation. A photonic link comprises a signal path and a feed-forward path. The feed-forward path includes an optical linearizer and a transversal equalizer connected with the optical linearizer. In this way, amplitude and phase matching of the error in the signal path is obtained over a wide bandwidth. This, in turn, enables a broadband enhancement of the link's spur free dynamic range (SFDR).

16 Claims, 7 Drawing Sheets

BROADBAND LINEARIZATION OF PHOTONIC MODULATION USING TRANSVERSAL EQUALIZATION

BACKGROUND

1. Field

The present disclosure relates to the field of photonics. In particular, it relates to broadband linearization of photonic modulation using transversal equalization.

2. Description of Related Art

In both terrestrial and satellite systems, there are substantial interests in using photonic links for signal distribution in antenna systems. For example, wavelength division multiplexed (WDM) technologies and analog photonic links for antenna remoting are currently used in a variety of space-based and terrestrial platforms. In all these applications, the link's spur free dynamic range (SFDR)—a parameter directly related to the linearity of photonic modulation at the transmitter end—is an important figure of merit for meeting the antenna system's performance goals. Additionally, photonic links are also used in so called fiber-radio networks, which have a significant commercial potential for distributing microwave signals between the base station of a wireless network and the remote sites of transmit/receive antennas.

The SFDR of analog photonic links can be enhanced by linearization approaches such as 1) negative feedback, 2) pre-distortion, or 3) feedforward error correction. The suppression of harmonic distortion in electronic amplifiers via negative feedback is well described in seminal papers/texts that discuss the design of feedback circuits.

Negative feedback for electronic amplifiers is discussed, for example, in "The Art of Electronics" by P. Horowitz and W. Hill, Cambridge University Press, 1989. Predistortion is discussed, for example, in R. Sadhwani, J. Bassak, B. Jalali, "Adaptive Electronic Linearization of Fiber Optic Links," Paper ThG7, Optical Fiber Conference (OFC) 2003, Atlanta, Ga., Mar. 23-28, 2003.

For the broadband linearization of optical links, a feedforward scheme has the advantage that it does not incur design constraints for the time-delay generated in the feedback path, as in a negative feedback approach. The feedforward approach can also operate over a wider bandwidth than pre-distortion schemes because it does not rely on the use of nonlinear circuit elements to compensate—over a broadband—nonlinearities present in the modulation transfer curve.

The feed-forward approach was originally developed for linearizing electronic amplifiers, especially high power amplifiers and traveling wave tubes. Its application to photonic modulation was first reported in R. M. de Ridder, K. Korotky, "Feedforward compensation of integrated optic modular distortions," Paper WH5, Optical Fiber Conference, 1990 and later in M. Nazarathy, J. Berger, A. Ley, I. Levi and Y. Kaggan, "Progress in Externally Modulated AM CATV Transmission Systems," J. Lightwave Technol., vol. 11, no. 1, pp. 82-105, 1993. In particular, the Nazarathy paper mentioned the importance of maintaining a flat frequency response for all components (photonic and electronic) used in the feedforward path.

However, feedforward schemes for wideband distortion suppression are usually hampered by the existence of RF-ripples (for both amplitude and phase) in the feed-path to the linearizer. These non-idealities in the feedforward path can reduce significantly the null-depth of distortion cancellation, because they affect the designed balance in amplitude and phase between the signal-arm (where the signal travels) and the error-arm (where the distortion correction signal is generated). The Nazarathy reference mentions the importance of maintaining a flat frequency response for all components (photonic and electronic) used in the feedforward path, but offers no solution for broadening the effective bandwidth of the linearizer.

SUMMARY

According to a first aspect, an optical feed-forward apparatus is disclosed, comprising: a first optical detector emitting a first detected signal; a first optical coupler, coupling a modulated optical signal with the first optical detector, the modulated optical signal being indicative of a radio frequency (RF) input; a first subtractor (G1), receiving the first detected signal and the RF input, the first subtractor emitting an error signal ($\delta_{IN}$); a transversal equalizer, receiving the error signal and emitting an equalized error signal; an optical linearizer, receiving the equalized error signal and emitting an optical correction signal; and a second optical coupler, coupling the modulated optical signal with the optical correction signal, to output a linearized optical signal; a second subtractor having first input coupled to the radio frequency input and having an output for adjusting tap coefficients of the transversal equalizer; and a third optical coupler coupling a portion of the modulated optical signal and the optical correction signal to a second optical detector, an output of the second optical detector being applied to a second input of the second subtractor.

According to a second aspect, a method to linearize an optical beam is disclosed, comprising: emitting a modulated optical signal; providing a radio frequency (RF) input; detecting the modulated optical signal, emitting a first detected signal; forming a difference between the first detected signal and the RF input, thus emitting an error signal; equalizing the error signal, thus emitting an equalized error signal; receiving the equalized error signal and emitting an optical correction signal; and coupling the modulated optical signal with the optical correction signal, to output a linearized optical signal.

According to a third aspect, a feed-forward linearizer for reducing distortion components in a radio frequency (RF) signal carried as an optical signal in a fiber optic link is disclosed, comprising: means for optically modulating the RF signal and producing a first composite signal; means for processing the first composite signal to obtain an error signal; non-linear equalizing means receiving the error signal and outputting an equalized error signal; means for optically modulating the error signal and producing a second composite signal; and means for subtracting the second composite signal from the first composite signal.

According to a fourth aspect, a photonic link is disclosed, comprising: a signal path; and a feed-forward path, the feed-forward path including an optical linearizer and a transversal equalizer connected with the optical linearizer.

The present disclosure removes the implementation non-idealities via the insertion of a transversal equalizer placed before the photonic linearizer. Specifically, the transversal equalizer according to the present disclosure generates amplitude- and phase-responses that compensate for the presence of RF-ripples in the feedforward path, or slow (time-domain) drifts associated with environmental perturbations of the transmitter. In this manner, the amplitude- and phase-matching requirements for achieving a deep null in the distortion cancellation can be satisfied over a wide bandwidth. This, in turn, enables a significant broadband enhancement of the link's spur free dynamic range (SFDR).

BRIEF DESCRIPTION OF THE DRAWINGS

The present invention will be understood and appreciated more fully from the following detailed description taken in conjunction with the drawings in which.

DETAILED DESCRIPTION

Figure 1:
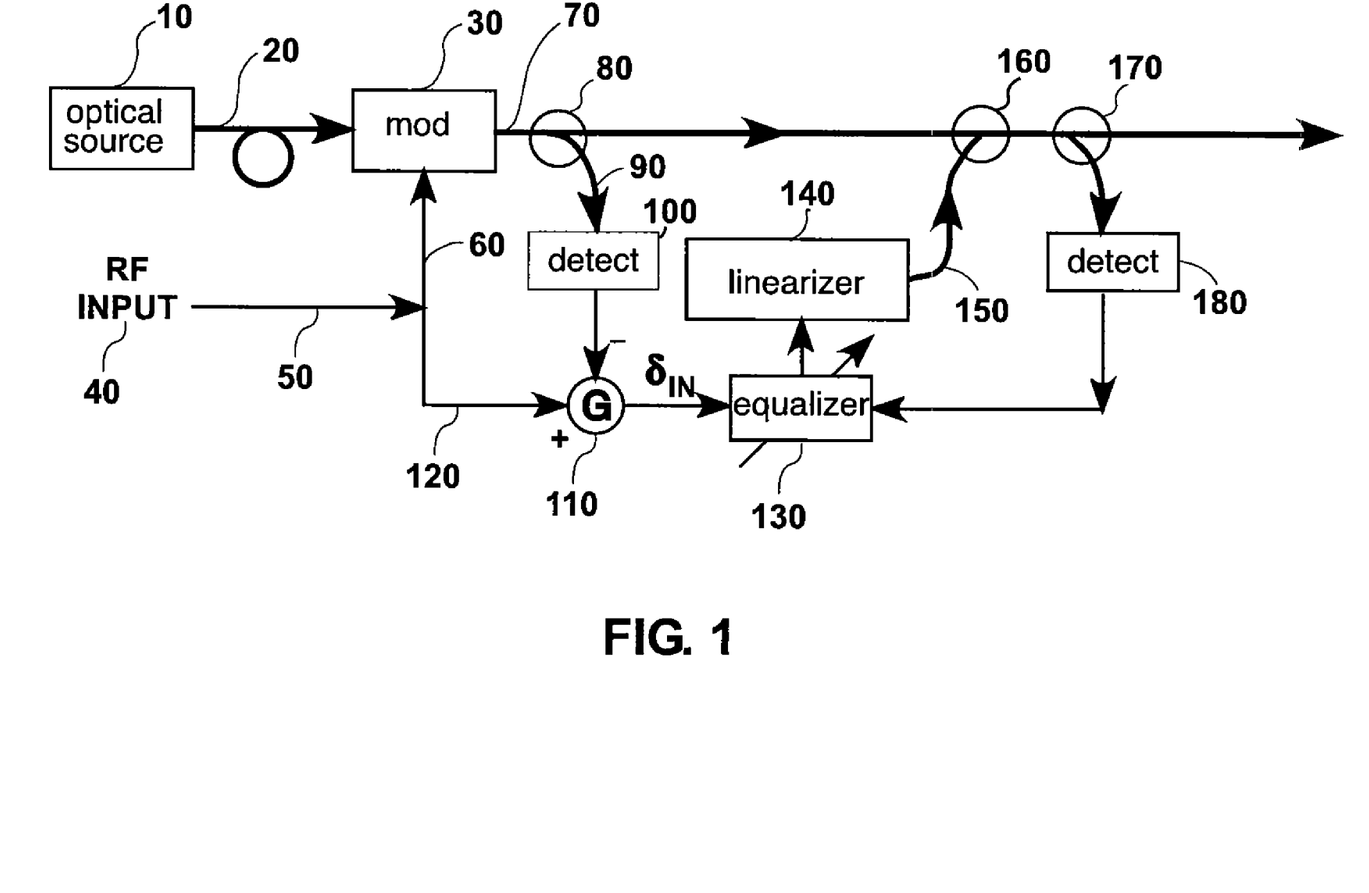
FIG. 1 shows a schematic representation of the apparatus according to the present disclosure.

FIG. 1 shows a schematic representation of the apparatus according to the present disclosure, where optical paths are represented with bold lines.

An optical source 10 provides optical radiation along an optical path 20 to a modulator 30. For an externally modulated scheme, the modulator 30 modulates a radio-frequency (RF) signal input 40 provided, along a connection 50, 60 to the modulator 30.

The optical source 10 is a laser source, emitting a coherent optical signal. The optical path 20 is an optical fiber or waveguide. FIG. 1 shows an external modulation scheme for impressing an RF-input on the optical carrier. Alternatively, a direct modulation scheme can be employed, where the modulator 30 is not needed and the bias current is modulated to a diode laser according to the RF-input.

In the external modulation scheme of FIG. 1, the modulator 30 can be an electro-absorption modulator or a Mach-Zehnder electro-optic modulator. The RF inputs to a directly modulated diode laser or the modulator 30 are analog voltages that typically cover a narrowband centered at a specific RF frequency. An input signal consisting of two frequencies ($f_1$, $f_2$) is commonly called a two-tone input. A two-tone input generates $3^{rd}$ order intermodulation distortions at the frequencies $2f_1$-$f_2$ and $2f_2$-$f_1$.

Figure 2A:
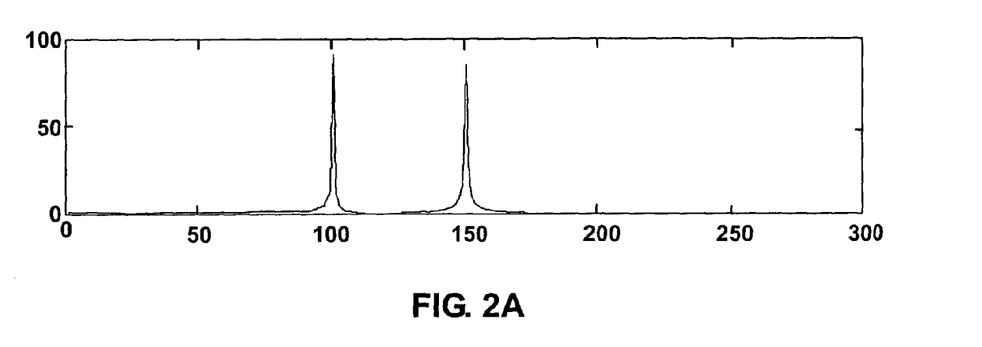
FIG. 2A shows a two-tone input.
Figure 2B:
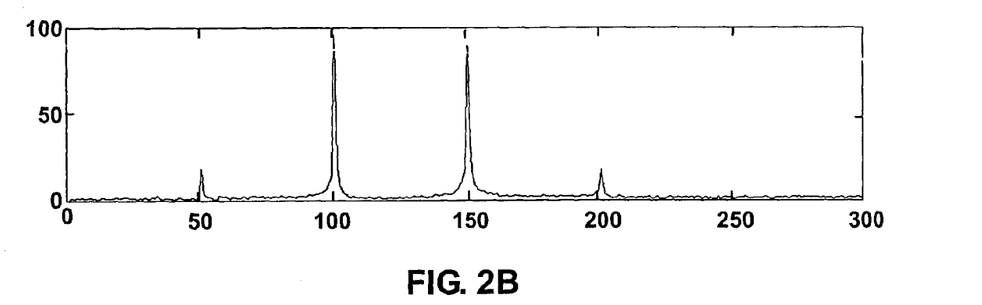
FIG. 2B shows $3^{rd}$ order intermodulation distortions for the two-tone input of FIG. 2A.

FIG. 2A shows, for example, a two-tone input with $f_1$=100 MHz and $f_2$=150 MHz. FIG. 2B shows the $3^{rd}$ order intermodulation distortions centered at 50 MHz and 200 MHz.

Turning to FIG. 1, the output 70 of the modulator 30 provides an optical signal which carries the RF signal. Such output also includes optical distortions due to the non-ideal modulation transfer characteristics of the modulator 30. According to the present disclosure, such distortions present on the signal path are corrected by means of a feedforward path, discussed in detail below.

A first optical coupler 80 provides a replica of the optical signal carrying the RF signal on a connection 90. Optical couplers, are known to the person skilled in the art and will not be described here in detail. The replica is converted to a voltage signal by means of an optical detector 100, e.g. a photodiode. A subtractor or differential summer 110 subtracts the converted voltage signal from the RF input 40 provided along a connection 120. The output of the subtractor 110 is an error signal $\delta_{IN}$, that is proportional to the modulation distortion.

The error signal $\delta_{IN}$ is fed as an input to a transversal equalizer 130. Transversal equalizers, known as such, are typically finite impulse response (FIR) filters with transfer functions set by a set of N tap-coefficients $a_n$, where n=0 . . . N-1.

Figure 3:
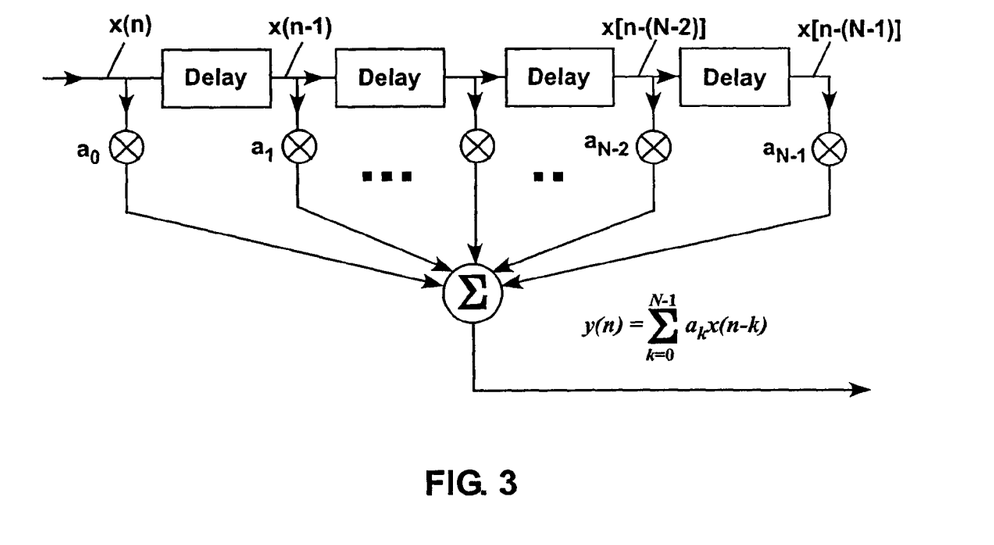
FIG. 3 shows an example of a FIR filter.

FIG. 3 shows an example of a FIR filter, where the input x(n) of FIG. 3 corresponds to the signal $\delta_{IN}$, of FIG. 1 and the output y(n) of FIG. 3 corresponds to the output of element 130 of FIG. 1. Unlike bandpass filters, which are built from inductors and capacitors, transversal equalizers use tapped time-delay lines or shift registers (according to the frequency range of operation) to generate the filter transfer function.

Transverse equalizers are discussed, for example, in Chapters 1 and 2 of "Adaptive Signal Processing" by B. Widrow and S. Stearns, Prentice Hall, New Jersey 1985. See also "Adaptive Filter Theory", S. Haykin, Prentice Hall Information and System sciences series, T. Kailtah series editor, Prentice Hall, Upper Saddle River, N.J. 07458, 1998.

Turning back to FIG. 1, the output of the transversal equalizer 130 is sent to an optical or photonic linearizer 140. The linearizer 140 provides an optical correction signal along connection 150, which is coupled to the primary optical signal carrying the RF modulation, i.e. to the signal arm, by means of a second optical coupler 160.

Photodetection of the combined optical outputs from the modulator 30 and the linearizer 140 provides for cancellation of the distortion.

Additionally, adaptive control of the weights (see, for example, the tap-coefficients $a_n$ of FIG. 3) in the transversal equalizer 130 may also be provided, by means of an optical coupler 170 and an optical detector 180 which provide the transversal equalizer 130 with a voltage signal proportional to the corrected signal.

The presence of adaptive control is preferred, because it allows variation of the tap-coefficients of the transverse equalizer 130, so that effective distortion cancellation can be accomplished even in presence of dynamic perturbations to the feedforward photonic transmitter.

Therefore, the above disclosed linearizer allows modulator induced distortions to be compensated by means of a feedforward linearization scheme that incorporates transversal equalization.

Figure 4:
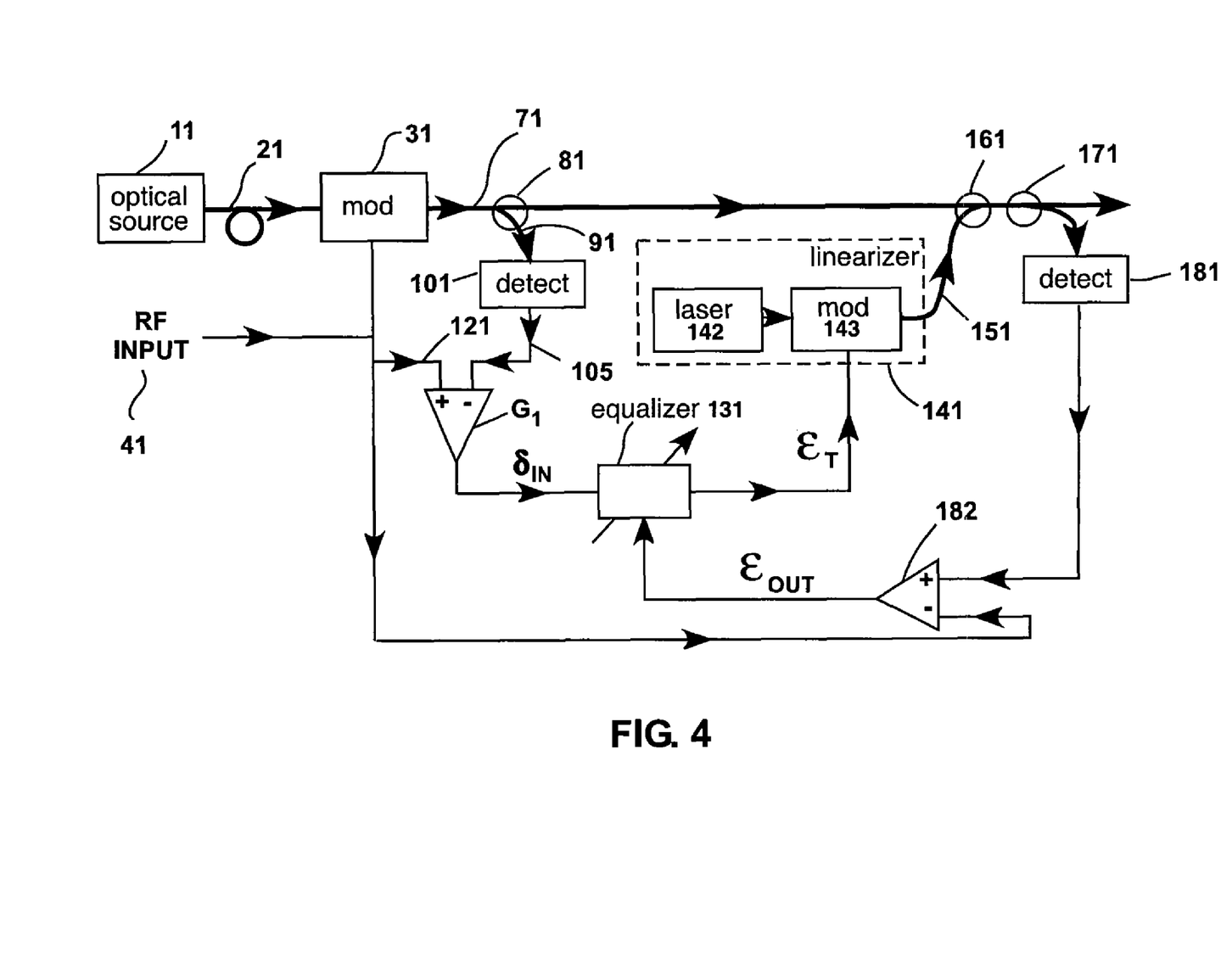
FIG. 4 shows a more detailed embodiment of the apparatus disclosed in FIG. 1.

FIG. 4 shows a more detailed embodiment of the apparatus for the externally modulated scheme disclosed in FIG. 1.

An optical source 11 having an optical wavelength $\lambda_1$ provides optical radiation along an optical path 21 to a modulator 31. The modulator 31 modulates a radio-frequency (RF) signal input 41 fed to the modulator 31.

The output 71 of the modulator 31 provides an optical signal which carries the RF signal. Because the modulation transfer curve of modulator 31 is not perfectly linear, an imperfect (e.g. slightly compressed) sine-envelope will be generated, comprising inband intermodulation distortions.

Distortion in optical modulators is addressed, for example, in William Bridges and James Schaffner, "Distortion in Linearized Electrooptic Modulators," IEEE Transactions on Microwave Theory and Techniques, Vol. 43, No. 9, 1995, pp. 2184-2197.

The distorted modulation envelope can be represented as $$I_1 = M_1(1+D)RF_{in}$$

where $M_1$ is the modulation efficiency of modulator 31, and D denotes the distortion (error) that needs to be cancelled to obtain a replica of the input signal $RF_{in}$.

A first optical coupler 81 provides a replica of the optical signal carrying the RF signal on a connection 91. Such replica is converted to a voltage signal by means of an optical detector 101 (e.g. a photodiode). In particular, the photodiode 101 taps-off a small fraction $\eta_1$ of the distorted modulation signal $I_1$ for photodetection with efficiency $\eta_D$, to obtain a voltage output 105 given by $$V_1 = \eta_1 \eta_D I_1$$

The output 105 of the optical detector 101 is fed to a differential amplifier $G_1$. The differential amplifier $G_1$ subtracts the converted voltage signal provided along connection 105 from the RF input signal 41 provided along a connection 121. In particular, the input along connection 121 can be expressed as $V_{in} = M_1 \eta_1 \eta_D RF_{in}$. The output $\delta_{IN}$ of the comparator $G_1$ is an error signal proportional to the distortion. Specifically, $\delta_{IN} = -G_1 M_1 \eta_1 \eta_D RF_{in} D$.

According to the present disclosure, transverse equalization is used to enhance the effective cancellation bandwidth for D. According to the embodiment shown in FIG. 4, the error signal $\delta_{IN}$ is input to a transversal equalizer 131. The output $\epsilon_T(\omega)$ of the transversal equalizer 131 will be in the form $\epsilon_T(\omega) = T(\omega) \delta_{IN}(\omega)$, where $T(\omega)$ is the transfer function of the transverse equalizer and $\delta_{IN}(\omega)$ is the Fourier transform of $\delta_{IN}$.

The output of the transversal equalizer 131 is sent to an optical or photonic linearizer 141. The linearizer 141 comprises an optical source (e.g., a laser) 142 coupled to an optical modulator 143. The function of the optical modulator 143 is to impress the equalized RF-distortion $\epsilon_T(\omega)$ on a second optical wavelength $\lambda_2$ generated with laser 142. $\lambda_1$ (the optical wavelength of laser 11) and $\lambda_2$ are, for example, aligned along the ITU-grid with $\Delta\lambda = 0.8$ nm or $\Delta f = 100$ GHz for laser wavelength stabilization, and are preferably chosen so that their beat frequency is much larger than the bandwidth of the photoreceiver to be coupled to the linearizer. In this manner, it is ensured that optical powers, not fields, are summed at the photoreceiver (not shown in the figure) located downstream of the signal path.

In other words, assuming that the detection bandwidth of the photoreceiver is 20 GHz, when the beat frequency between $\lambda_1$ and $\lambda_2$ is as high as 100 GHz, the term in the photodetector current due to the optical heterodyning of the optical fields in $\lambda_1$ and $\lambda_2$ becomes insignificant, because 100 GHz is way beyond the detection bandwidth of the photoreceiver. Therefore, only the terms that are proportional to the optical powers in each of the two wavelengths are summed.

The linearizer 141 provides an optical correction signal along connection 151, which is coupled to the main optical signal by means of a further optical coupler 161.

The cancellation of the modulation distortion D is accomplished as follows. If the error signal $\epsilon_T(\omega)$ is modulated onto $\lambda_2$ with a positive transfer efficiency $M_2$, the summed output $I_{sum}$ of the signal arm and the error (feed-forward) arm, downstream of the output coupler 161 (having efficiency $\eta_2$), is $I_{sum} = M_1(1+D) RF_{in} - \eta_2 M_2 T \delta_{in}$. In this expression, the assumption has been made that modulator 143 generates little or no distortion because $\epsilon_T(\omega)$ is a small signal.

Therefore, when the equality $\eta_1 \eta_D \eta_2 T G_1 M_2 = 1$ is satisfied, $I_{sum} = M_1 RF_{in}$, which is an undistorted replica of the original RF-input. As already mentioned, this summation of the optical intensities from the signal path and the error path occurs during photodetection at the link's photoreceiver. It should also be noted that the lengths of antenna remoting links are typically only several hundred meters. Therefore, it is not expected that fiber-dispersion will impact the distortion-cancellation accuracy at the photoreceiver.

According to a further embodiment of the present disclosure, incorporation of adaptation in the transverse equalizer is also disclosed, so that the tap weights of the transverse equalizer 131 can respond (via feedback algorithms such as the Least-Mean-Square algorithm) to changes in environmental perturbations or the input frequencies of $RF_{in}$. In FIG. 4, adaptive control of the weights of the transversal equalizer 131 is provided by means of an optical coupler 171, an optical detector 181, and a differential amplifier 182, which provide the transversal equalizer 131 with a voltage input $\epsilon_{out}$. The differential amplifier 182 subtracts the RF input 41 from the output of the optical detector 181.

The above described feedback path provides adaptive control for the tap-coefficients of the transverse equalizer 131. In other words, the coefficients of the transverse equalizer 131 are adjusted to minimize the error signal $\epsilon_{out}$. In this manner, the feedforward linearization scheme can guard against dynamically varying perturbations on the linearized transmitter. As discussed later in the embodiment shown in FIG. 7, incorporating a filter in the feedback path will also reduce the number of tap coefficients needed in 131. This has the advantage of reducing the computational cost and hence adjusting the parameters in real time.

If the frequency responses (amplitude and phase) of all components in the feed-forward path have no ripples, and the time-delays of the signal path and the error path are well balanced, then the transfer function $T(\omega)$ of the transversal equalizer needs only be a scalar quantity to accomplish perfect distortion cancellation. However, in practice, dynamically varying ripples in the differential phase between the two paths will cause time-delay errors, and amplitude-ripples will prevent deep nullings of the distortion D.

Figure 5:
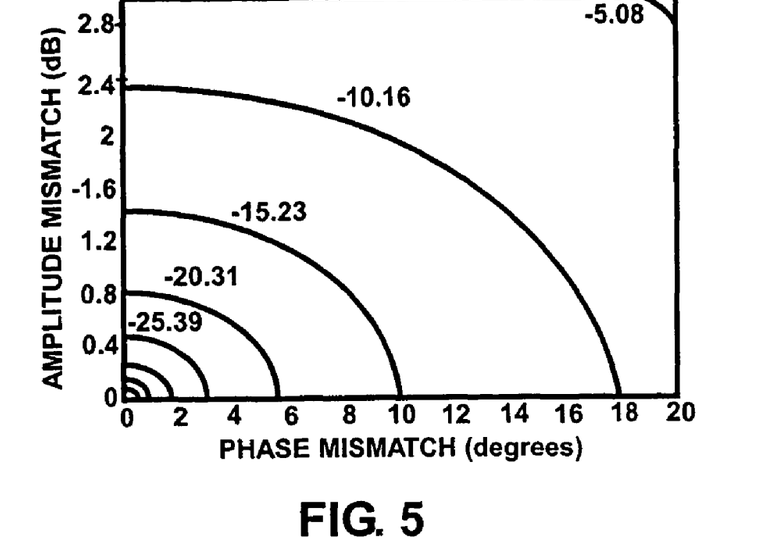
FIGS. 5 and 6 show diagrams depicting the estimated precision in amplitude and phase angle that two phasors must match to accomplish a targeted range of vectorial cancellation.
Figure 6:
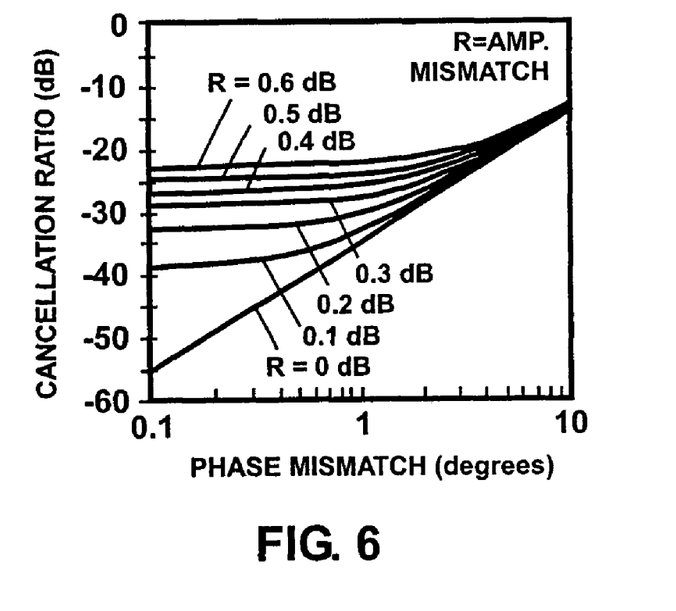

FIGS. 5 and 6 show the estimated precision in amplitude and phase-angle that two phasors, $Vec_1$ (corresponding, for example, to the signal along the signal link) and $Vec_2$ (corresponding, for example, to the signal along the feedforward link) must match to accomplish a targeted range of vectorial cancellation between $Vec_1$ and $Vec_2$.

In particular, FIG. 5 shows a graph where the phase mismatch $\Delta\theta$ between $Vec_1$ and $Vec_2$ is plotted against the amplitude mismatch $|Vec_2/Vec_1|^2$ between $Vec_1$ and $Vec_2$. A 'cancellation ratio' CR between $Vec_1$ and $Vec_2$ can be defined as $CR = (R/Vec_1)^2$, where $R = |Vec_2 - Vec_1|$. The larger the cancellation ratio CR is, the poorer the distortion cancellation. The cancellation ratio CR can also be expressed in terms of the phase mismatch and amplitude mismatch of the vectors as:

$$CR = \frac{R}{Vec_1} = \sqrt{1 - 2\left|\frac{Vec_2}{Vec_1}\right| \cos(\Delta\theta) + \left|\frac{Vec_2}{Vec_1}\right|^2}$$

FIG. 5 shows level curves of the contour plot of the cancellation ratio CR as a function of the phase and amplitude mismatch. Similarly, FIG. 6 shows level curves of the parameter $R = |Vec_2 - Vec_1|$ as a function of the phase mismatch $\Delta\theta$ and cancellation ratio CR.

As shown in FIGS. 5 and 6, to achieve a cancellation ratio of about 20 dB (for a SFDR enhancement of about 6.7 dB with respect to third order intermodulation distortion), the amplitude imbalance must be <0.6 dB and the phase mismatch <4°. In other words, the SFDR enhancement is ⅓ the reduction of the intermodulation distortion, which is given by the cancellation ratio. Hence, a cancellation ratio of 20 dB gives a SFDR enhancement of 6.7 dB.

For example, the sheer existence of "ripples" (with respect to frequency) due to reactance mismatches (that occur in the RF-paths feeding modulator 143 of FIG. 4) will lead to a violation of the above matching requirements, when applied over a large bandwidth.

Therefore, without the transverse equalization introduced by $T(\omega)$, this feedforward linearization approach will only work over relatively narrow frequency bands (<100-200 MHz) centered at low frequencies. The transverse equalization introduced by the equalizer according to the present disclosure serves to "trim" the amplitude and phase of $\delta_{IN}(\omega)$, so that deep distortion cancellation can still be achieved, in spite of the occurrence of amplitude and phase ripples.

The transversal equalizer 131 according to the present disclosure can comprise one or more finite impulse response (FIR) filters. To achieve broadband linearization, path equalization must be ensured between the signal path and the feedforward path at the center of the microwave band. In order to do so, the transverse equalizer can be implemented as a digital FIR filter for RF-input frequencies that lie in the 1-2 GHz range, or as a tapped delay-line filter fabricated from distributed amplifiers at higher frequencies.

The transfer function $T(\omega)$ of a transverse equalizer with N taps ($a_n$, where n=0 denotes the center tap) is $$T(\omega) = \Sigma a_n e^{jn\omega\tau_d}$$

If we let $a_{\pm n} = g_n \pm i p_n$, then $T(\omega)$ can be expressed as $T(\omega) = g_0 + 2[G(\omega) + iP(\omega)]$ where $$G(\omega) = \sum_n g_n \cos(n\omega\tau_d) \text{ and}$$

$$P(\omega) = \sum_n p_n \sin(n\omega\tau_d).$$

From this expression for $T(\omega)$, it can be readily seen that the Fourier coefficients $g_n$ of $G(\omega)$ and $p_n$ of $P(\omega)$ can be handily utilized to determine the real part of $T(\omega)$, and to linearize its phase. For example, in a two-tap filter with $\omega\tau_d = \pi/2$, $T(\omega)$ is given by $T(\omega) = \sqrt{a_0^2 + a_1^2} \, e^{j\phi}$, where $\phi = -\tan^{-1}\left(\frac{a_1}{a_0}\right)$.

As already shown in FIG. 4, to further achieve broadband linearization, the present disclosure also provides adaptive control of the tap coefficients after comparison with the known RF-input in a differential amplifier 182, so that $T(\omega)$ becomes an adaptive transfer function set by multiple variables $a_n$. Specifically, the output $\epsilon_{out}$ of the differential amplifier 182 is used to determine $a_n$, according to common algorithms known to the person skilled in the art, such as the least-mean-square (LMS) or Sample Matrix Inversion (SMI) algorithms. Ideally, the output $\epsilon_{out}$ of the differential amplifier 182 will approach a null when the optical detector 181 detects a close replica of the original RF-input $RF_{in}$.

In addition to accommodating a variety of RF-ripples in different microwave bands, the adaptive feedback loop can be used to optimize $a_n$ so that the effects of environmental perturbations on the operation of the modulator can be neutralized.

Figure 7:
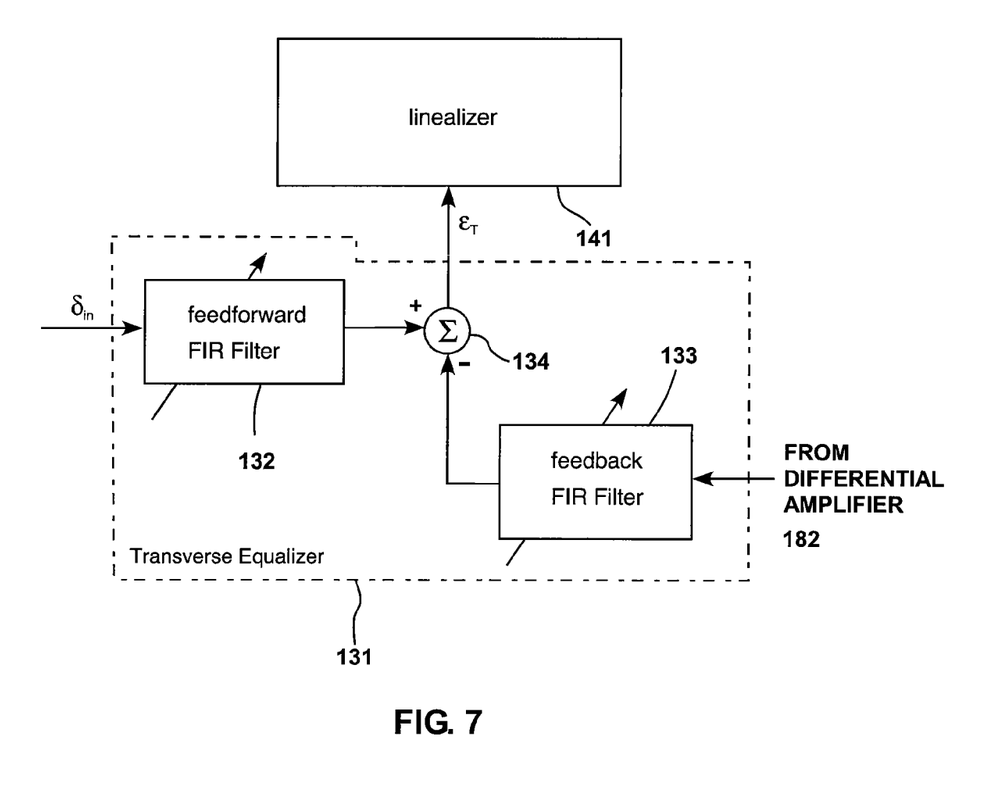
FIG. 7 shows a second embodiment of the transversal equalizer according to the disclosure.

Further, incorporation of the feedback path enables an alternative architecture to be adopted for the transverse equalizer, as shown in FIG. 7.

In particular, FIG. 7 shows a second embodiment of the transversal equalizer, where the transversal equalizer comprises two adaptive FIR filters, a feedforward and a feedback filter. The combination of the feedforward and feedback filters forms a decision feedback equalizer (DFE). The summed output of the two FIR filters is sent to the error modulator.

Specifically, according to the embodiment of FIG. 7, the transverse equalizer 131 comprises a feedforward FIR filter 132 and a feedback FIR filter 133. The input to the feedforward FIR filter 132 is the error signal $\delta_{IN}$. The input to the feedback FIR filter 133 is the output from the differential amplifier 182 of FIG. 4. The output of the feedback FIR filter 133 is subtracted from the output of the feedforward FIR filter 132 in a subtractor 134. The output of the subtractor 134 forms the signal $\epsilon_T$ sent to the linearizer 141 of FIG. 4. Incorporation of a filter in the feedback path is preferred, because it allows to reduce the number of tap coefficients needed.

Figure 8A:
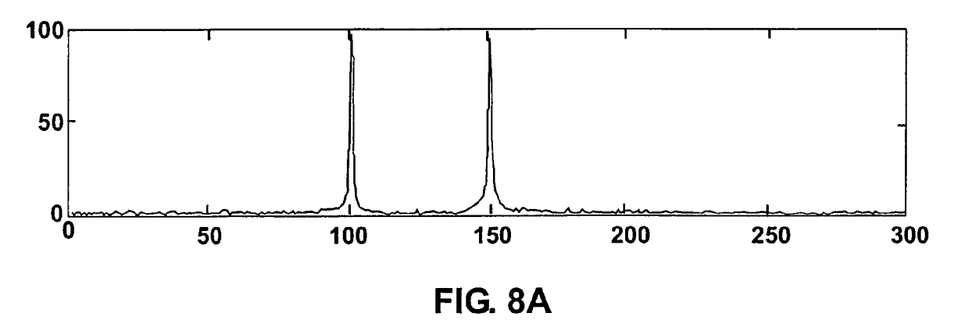
FIGS. 8A and 8B show examples of the output signal of the circuit according to the present disclosure.
Figure 8B:
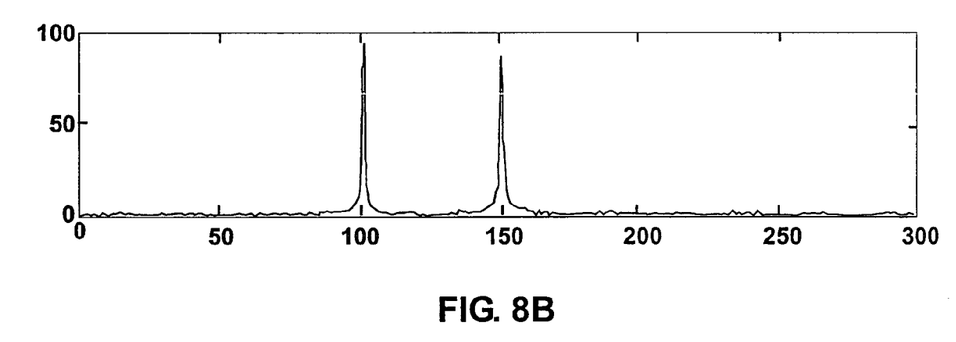

FIGS. 8A and 8B show examples of the output signal of the circuit according to the present disclosure, in presence of an input as shown in FIG. 2A and a distortion as shown in FIG. 2B. It can be seen that the intermodulation distortions shown in FIG. 2B have been eliminated. The output shown in FIG. 8B is obtained using the embodiment of the transversal equalizer shown in FIG. 7, i.e. in presence of an additional feedback filter 133. The output shown in FIG. 8A is obtained using an embodiment of the transversal equalizer where only a feedforward FIR filter has been used.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . . "

What is claimed is:

1. An optical feedforward apparatus comprising:
    a first optical detector emitting a first detected signal;
    a first optical coupler, coupling a modulated optical signal with the first optical detector, the modulated optical signal being indicative of a radio frequency input;

a first subtractor, receiving the first detected signal and the radio frequency input, the first subtractor emitting an error signal;

a transversal equalizer, receiving the error signal and emitting an equalized error signal;

an optical linearizer, receiving the equalized error signal and emitting an optical correction signal;

a second optical coupler, coupling the modulated optical signal with the optical correction signal, to output a linearized optical signal;

a second subtractor having first input coupled to the radio frequency input and having an output for adjusting tap coefficients of the transversal equalizer; and a third optical coupler coupling a portion of the modulated optical signal and the optical correction signal to a second optical detector, an output of the second optical detector being applied to a second input of the second subtractor.

2. The optical feedforward apparatus of claim 1, wherein the first subtractor is a differential amplifier.

3. The optical feedforward apparatus of claim 1, further comprising:

a first optical source emitting a first optical signal; and a first modulator receiving the first optical signal and modulating the radio frequency input, the first modulator emitting the modulated optical signal.

4. The optical feedforward apparatus of claim 1, further comprising a first optical source and a modulator, which in combination, emit the modulated optical signal.

5. The optical feedforward apparatus of claim 4, wherein the third optical coupler is located downstream of the second optical coupler, the third optical coupler coupling the linearized optical signal to the second optical detector, the second optical detector emitting a second detected signal.

6. The optical feedforward apparatus of claim 5, wherein the second subtractor is located between the second optical detector and the transversal equalizer, the second subtractor receiving the second detected signal and the radio frequency input signal, and emitting an adaptive correction signal to tap coefficient inputs of the transversal linearizer.

7. The optical feedforward apparatus of claim 6, wherein the second subtractor is a differential amplifier.

8. The optical feedforward apparatus of claim 6, wherein the transversal equalizer comprises:

a feed-forward filter receiving the error signal and having a feed-forward filter output;

a feedback filter receiving the adaptive correction signal and having a feedback filter output; and a third subtractor, receiving the feed-forward filter output and the feedback filter output, the equalized error signal being a difference between the feed-forward filter output and the feedback filter output.

9. The optical apparatus of claim 8, wherein the third subtractor is a differential amplifier.

10. The optical feedforward apparatus of claim 1, wherein the transversal equalizer is an adaptively controlled transversal equalizer.

11. The optical apparatus of claim 1, wherein the optical apparatus further comprises:

a second optical source emitting a second optical signal; and a second modulator receiving the second optical signal and modulating the equalized error signal, the second modulator emitting the optical correction signal.

12. The optical apparatus of claim 11, wherein the first optical source emits a first source optical beam having a first frequency and the second optical source emits a second source optical beam having a second frequency, the second frequency being different from the first frequency.

13. The optical apparatus of claim 12, wherein a beat frequency between the second frequency and the first frequency is larger than the bandwidth of a photoreceiver to be coupled to the optical apparatus.

14. The optical apparatus of claim 1, wherein the optical apparatus further comprises a second optical source and a modulator receiving the equalized error signal and emitting the optical correction signal.

15. A method to linearize an optical beam comprising:

emitting a modulated optical signal;

providing a radio frequency input;

detecting the modulated optical signal, emitting a first detected signal;

forming a difference between the first detected signal and the radio frequency input, thus emitting an error signal;

adaptively equalizing the error signal, thus emitting an equalized error signal;

receiving the equalized error signal and emitting an optical correction signal;

coupling the modulated optical signal with the optical correction signal, to output a linearized optical signal;

detecting the linearized optical signal, emitting a second detected signal;

forming a difference between the second detected signal and the radio frequency input, thus emitting an adaptive error correction signal; and applying the adaptive error correction signal to a transversal equalizer.

16. The method of claim 15, wherein adaptively equalizing the error signal comprises equalizing the error signal by means of combined feedforward and feedback filtering.

* * * * *